United States Patent [19]

Hernandez

[11] Patent Number: 5,710,192
[45] Date of Patent: Jan. 20, 1998

[54] POLYDIENE DIOLS IN RESILIENT POLYURETHANE FOAMS

[75] Inventor: Hector Hernandez, Houston, Tex.

[73] Assignee: Shell Oil Company, Houston, Tex.

[21] Appl. No.: 724,940

[22] Filed: Oct. 2, 1996

[51] Int. Cl.⁶ .................................................. C08G 18/04
[52] U.S. Cl. .................... 521/155; 521/170; 521/174; 521/189
[58] Field of Search ................................. 521/155, 170, 521/174, 189

[56] References Cited

U.S. PATENT DOCUMENTS

| | | | |
|---|---|---|---|
| 4,939,184 | 7/1990 | Kennedy | 521/170 |
| 5,039,755 | 8/1991 | Chamberlain et al. | 525/338 |
| 5,234,996 | 8/1993 | Mori et al. | 528/59 |
| 5,376,745 | 12/1994 | Handlin et al. | 526/178 |
| 5,391,637 | 2/1995 | Willis et al. | 525/385 |
| 5,391,663 | 2/1995 | Bening et al. | 526/178 |
| 5,393,843 | 2/1995 | Handlin et al. | 525/332.8 |
| 5,405,911 | 4/1995 | Handlin et al. | 525/139 |
| 5,416,168 | 5/1995 | Willis et al. | 525/333.2 |
| 5,418,296 | 5/1995 | Willis et al. | 525/385 |

*Primary Examiner*—John M. Cooney, Jr.
*Attorney, Agent, or Firm*—Beverlee G. Steinberg

[57] ABSTRACT

Polyurethane foams having high resilience, significantly improved humid aging, excellent tear strength, and light color are formed from a polydiene diol, preferably a hydrogenated polybutadiene diol, having a hydroxyl functionality from 1.6 to 2.0 and from an aromatic polyisocyanate having an isocyanate functionality of from 1.8 to 2.5. The polydiene diol is preferably blended with foaming agents prior to addition of the highly reactive polyisocyanate.

20 Claims, No Drawings

POLYDIENE DIOLS IN RESILIENT POLYURETHANE FOAMS

FIELD OF THE INVENTION

This invention relates to flexible polyurethane foams containing a polyol, especially polyurethane foams having high resilience and good tear resistance.

BACKGROUND OF THE INVENTION

Polyurethane foams having high resilience are typically produced from polyether triols having a number average molecular weight from 4,500 to 6,000 and an isocyanate which provides a narrow range of crosslink density. The polyether triols typically have an average functionality of from 2.4 to 2.7 hydroxyl groups per molecule as a result of unsaturated endgroups that form during manufacture of the triol. Toluene diisocyanate (TDI), diphenyl methane diisocyanate (MDI), TDI/MDI mixtures, and modified TDI or MDI versions are used to produce foams with broad processing latitude. Isocyanate functionality is typically 2.0, and in most cases not higher than 2.3 isocyanate groups per molecule. The polyether triols form resilient foams when combined with the isocyanates having from 2.0 to 2.3 isocyanate groups per molecule under conditions which promote foaming.

U.S. Pat. No. 4,939,184 described the production of polyurethane foams from polyisobutylene triols and diols which were prepared cationically. The polyisobutylenes are premixed with an isocyanate, namely MONDUR® TD-80 isocyanate which is a mixture of meta and para isomers of toluene diisocyanate having a functionality of 2.0. Then water was added as a blowing agent to form the polyurethane foam. Foams obtained were of low resilience and were useful in energy absorbing applications.

U.S. patent application Ser. No. 08/494,640, which is now abandoned, incorporated herein by reference, described a high resilient polyurethane foam produced from a polydiene diol (Example 9). The foam's resiliency was achieved by adding an aromatic polyisocyanate having a functionality of from 2.5 to 3.0 isocyanate groups per molecule to assure adequate crosslinking. The polydiene diol foams produced showed excellent humid aging properties in comparison to conventional polyurethane foams; however they had limited tear strength and were a tan color which is less desirable for commercial purposes.

SUMMARY OF THE INVENTION

The present invention is a high resilience, high tear resistance polyurethane foam produced from a polydiene diol, preferably a hydrogenated polybutadiene diol, having a number average molecular weight from 1,000 to 20,000, more preferably from 1,000 to 10,000, most preferably from 3,000 to 6,000, and a functionality of from 1.6 to 2, more preferably from 1.8 to 2 hydroxyl groups per molecule. The resiliency of the foam is achieved by the use of the polydiene diol, which is a highly resilient rubber, and by selecting an appropriate amount of a aromatic polyisocyanate having a functionality of from 1.8 to 2.5 isocyanate groups per molecule to assure adequate crosslinking. The polydiene diol foams display excellent tear resistance and are near white in color.

DETAILED DESCRIPTION OF THE INVENTION

It has surprisingly been found that when a lower functionality aromatic polyisocyanate is added to a polydiene diol, a resilient polyurethane foam results which retains the good properties of polydiene diol foams made with higher functionality isocyanates (see, Ser. No. 08/494,640, which is now abandoned, incorporated herein by reference) and which has superior tear strength and a more marketable color than the foams made with higher functionality isocyanate.

The present invention is a resilient polyurethane foam comprising a polydiene diol having a number average molecular weight from 1,000 to 20,000, more preferably from 1,000 to 10,000, most preferably from 3,000 to 6,000, and a functionality of from 1.6 to 2, more preferably from 1.8 to 2, hydroxyl groups per molecule, from 70 to 130, more preferably 90 to 110, index amount of an aromatic polyisocyanate having a functionality of from 1.8 to 2.5 isocyanate groups per molecule, and a blowing agent. The foam displays superior tear resistance in comparison to conventional polyurethane foams and polydiene diol foams made with higher functionality isocyanate, plus it has a commercially viable coloration.

The polydiene diols used in this invention are prepared anionically such as described in U.S. Pat. Nos. 5,376,745, 5,391,663, 5,393,843, 5,405,911, and 5,416,168, incorporated herein by reference. The polydiene diols provide stable, resilient foams when the polydiene diol is hydrogenated although unsaturated polydiene diols will also result in polyurethane foams having high resilience. The polydiene diols have from 1.6 to 2, more preferably from 1.8 to 2 terminal hydroxyl groups per molecule and a number average molecular weight between 1,000 and 20,000, more preferably from 1,000 to 10,000, most preferably from 3,000 to 6,000. Hydrogenated polybutadiene diols are preferred and have 1,4-addition between 30% and 70% (between 30% and 70% of the monomer adds as 1,4-addition).

The diols thus described, on an average, have less than two hydroxyl groups per molecule. An average functionality of, for example, 1.8 means that about 80% of the molecules are diols and about 20% of the molecules are mono-ols. Since the majority of the product's molecules have two hydroxyl groups, the product is considered a diol.

Polymerization of the polydiene diols commences with a monolithium or dilithium initiator which polymerizes a conjugated diene monomer at each lithium site. The conjugated diene used is typically 1,3-butadiene or isoprene since other conjugated dienes cost more without providing advantages that justify the expense. The anionic polymerization is done in solution in an organic solvent, typically a hydrocarbon such as hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or 1,2-diethoxyethane (glyme) to obtain the desired amount of 1,4-addition. The optimum balance between low viscosity and high solubility in a hydrogenated polybutadiene polymer occurs at about a 50/50 ratio of 1,4-butadiene/1,2-butadiene. This butadiene microstructure can be achieved by polymerizing at 50° C. in cyclohexane containing about 10% by volume of diethylether or about 1000 ppm of glyme. For polyisoprene diols, high resiliency is achieved with more than 80% 1,4-addition of isoprene.

Anionic polymerization is terminated by addition of a functionalizing agent prior to termination. Functionalizing agents used are like those in U.S. Pat. Nos. 5,391,637, 5,393,843, and 5,418,296, incorporated herein by reference, but preferably ethylene oxide.

The preferred dilithium initiator is formed by reaction of two moles of sec-butyllithium with one mole of diisopropenylbenzene. This diinitiator is used to polymerize the conjugated diene monomer, preferably butadiene, in a solvent composed of 90 wt % cyclohexane and 10 wt % diethylether. The molar ratio of diinitiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked as the silyl ether (see, U.S. Pat. Nos. 5,376,745 and 5,416,168, incorporated herein by reference). A suitable initiator is hydroxypropyllithium in which the hydroxyl group is blocked as the trimethylsilyl ether. This monolithium initiator is used to polymerize the conjugated diene in hydrocarbon or polar solvent. The molar ratio of initiator to monomer determines the molecular weight of the polymer. The living polymer is then capped with one mole of ethylene oxide and terminated with one mole of methanol to yield the mono-hydroxy polydiene polymer. The silyl ether is then removed by acid catalyzed cleavage in the presence of water, yielding the desired polydiene diol.

The polydiene diols are hydrogenated to improve stability such that at least 90%, preferably at least 95%, of the carbon-to-carbon double bonds in the diols are saturated. Hydrogenation of these polymers and copolymers may be carried out by a variety of well established processes including hydrogenation in the presence of such catalysts as RANEY® Nickel (W. R. Grace), noble metals such as platinum and the like, soluble transition metal catalysts and titanium catalysts as in U.S. Pat. No. 5,039,755 incorporated herein by reference. A particularly preferred catalyst is a mixture of nickel 2-ethylhexanoate and triethylaluminum.

The diene microstructures are typically determined by $C^{13}$ nuclear magnetic resonance (NMR) in chloroform. Polybutadiene diols have at least about 40% 1,2-butadiene addition because, after hydrogenation, the polymer will be a waxy solid at room temperature if it contains less than about 40% 1,2-butadiene addition. To minimize viscosity of the diol, the 1,2-butadiene content should be between about 40 and 60%. Isoprene polymers have no less than 80% 1,4-isoprene addition in order to reduce the glass transition temperature ($T_g$) and viscosity.

The polydiene diols have hydroxyl equivalent weights between about 500 and about 10,000, more preferably between 500 and 5,000, most preferably between 1,500 and 3,000. Thus, for the polydiene diols, suitable number average molecular weights will be between 1,000 and 20,000, more preferably between 1,000 and 10,000, most preferably between 3,000 and 6,000.

The number average molecular weights referred to herein are number average molecular weights measured by gel permeation chromatography (GPC) calibrated with polybutadiene standards having known number average molecular weights. The solvent for the GPC analysis is tetrahydrofuran.

The isocyanates used in this invention are aromatic polyisocyanates since they have the desired fast reactivity to make foam. As the saturated polydiene diol has a functionality of about 2 hydroxyl groups per molecule, it had previously been believed that a polyisocyanate having a functionality of from 2.5 to 3.0 was needed to achieve a crosslink density that would result in a stable, high loadbearing and high resilient foam. However, it was found that a polyisocyanate having a functionality of from 1.8 to 2.5 results in a stable, high loadbearing, high resilient foam with greater tear strength than achieved with the higher functionality isocyanate. Further, the color of the foam is greatly improved for commercial purposes, changing from a tan color when higher functionality isocyanate is used to a near white color.

An example of a suitable aromatic polyisocyanate which is commercially available is RUBINATE® 9225 (ICI Americas) a liquid isocyanate consisting of a mixture of 2,4-diphenyl methane diisocyanate (MDI) and 4,4-MDI with a functionality of 2.06.

The polyurethane foams are produced from the polydiene diol, the aromatic polyisocyanate, water, an amine catalyst, a tin catalyst, and a silicone surfactant. Other ingredients like fire retardants, fillers, etc. may be added by those skilled in the art of foaming. The water, which causes foaming by reaction with the isocyanate to generate $CO_2$, may be varied to alter the foam density. Changing the water addition from 2 parts by weight to 6 parts by weight was seen to reduce density of the foam by about 60% without loss of other properties.

A variety of amine catalysts, tin catalysts, and silicone surfactants for making polyurethane foams are commercially available from Air Products and Chemicals under the trademark DABCO®. An example of a combination useful in making polyurethane foams from polydiene diols is DABCO® 33-LV amine catalyst, DABCO® DC-1 tin catalyst, and DABCO® DC-5160 silicone surfactant.

The polyurethane foams are preferably prepared by blending all of the components except the isocyanate. The polydiene diol is preferably preheated to reduce viscosity prior to blending. After blending, the aromatic polyisocyanate is quickly added and briefly stirred before pouring the mixture into a mold to hold the expanding foam. The foams can be aged after postcuring. Aging for 8 hours at 110° C. with no added humidity has been seen to increase tear resistance over unaged foams of similar formulations.

The polyurethane foams of the present invention are useful for making articles such as seat and upholstery cushions, carpet backings, gaskets, and air filters. Their light color can be easily dyed for distinctiveness.

DETAILED DESCRIPTION OF PREFERRED EMBODIMENTS

The preferred embodiment of the present invention is a resilient polyurethane foam comprising from 200 to 300 parts by weight of a hydrogenated polydiene diol having a number average molecular weight from 3,000 to 6,000 and a functionality of from 1.8 to 2.0 hydroxyl groups per molecule, from 2 to 6 parts by weight of water, from 90 to 110 index amount of an aromatic polyisocyanate having a functionality of from 1.8 to 2.5 isocyanate groups per molecule, from 0.5 to 2.0 parts by weight of an amine catalyst, from 0.5 to 1.5 parts by weight of a tin catalyst, and from 0 to 1.0 parts by weight of a silicon surfactant. The foam shows superior resiliency and tear resistance in comparison to conventional polyurethane foams, and polydiene diol foams made with higher functionality isocyanates.

By index is meant the amount of isocyanates to hydroxyl groups times 100. Therefore, an index of 100 is a ratio of isocyanates to hydroxyl groups of 1:1. A standard index used by the industry is 105 (1.05:1), which results in an excess of isocyanates. The most preferred embodiment of the invention uses an index of 100 (1:1).

The following examples are not intended to limit the present invention to specific embodiments although each example may support a separate claim which is asserted to be a patentable invention.

EXAMPLES

Ten example foams were prepared using polymer, isocyanate, catalyst, surfactant, and water in the combinations as shown in Table 1. Examples 1–5 were prepared using KRATON LIQUID™ L 2203 polymer (KLP 2203) (Shell Oil), a 4000 molecular weight hydrogenated polybutadiene diol, and RUBINATE® 9925 (ICI), a liquid isocyanate consisting of a mixture of 2,4-MDI and 4,4-MDI with 2.06 functionality. Comparison Example 9 was prepared from KLP 2203 and MONDUR® MR (Bayer), a polymeric MDI with 2.7 functionality. Examples 6–8, were prepared using KLP 2203 and a mixture of RUBINATE® 9925 and MONDUR® MR. Comparison Example 10 used ARCOL® 11-34 (Atlantic Richfield), a 4500 molecular weight polyether triol polymer that is used in commercial foams, and RUBINATE® 9925. The catalysts used for all Examples were DABCO® DC-1 (Air Products), a tin catalyst, and DABCO® 33-LV (Air Products), an amine catalyst. DABCO® DC5160 (Air Products) was added as a surfactant. Water was added to give the desired foam density. The foams were prepared as follows:

The polymer was preheated to 80° C. and weighed into a dried tin can. Catalysts, surfactant and water were then mixed in using a CAFRAMO® stirrer equipped with a 2-inch, regular pitch impeller. The isocyanate was then added and mixing was continued for 45 seconds. The mixture was poured into a paper mold and left undisturbed for the foam to rise. After 2 minutes, or when the skin had formed, the foam was postcured 10 minutes at 110° C. Examples 4 and 5 were then aged at 110° C. with no added humidity for about 8 hours. Formulations of the Examples are given in Table 1.

The finished foams were cut into 10×10×5 cm blocks with a band saw. The blocks were used for measurement of density and for testing compression, resilience and hysteresis loss. Smaller blocks 2.5×2.5×10 cm were cut for testing tear resistance.

Density

Density was determined from the weight of a block and its dimensions. Results are given in Table 2.

Resilience

A 16 mm diameter (16.3 g) steel ball was dropped from a height of 51.6 cm through a 38 mm inside diameter clear plastic tube onto a block of foam. The rebound height was measured and resilience was calculated as 100× (rebound height/drop height). Results are given in Table 2.

Compression and Hysteresis Loss

Compression and hysteresis loss were measured on an INSTRON® Machine Model 5565. A foam block was placed between 2 parallel plates and compressed 60% then unloaded for four cycles at a crosshead speed of 12.5 cm/min. On the fourth cycle, the force required to compress the foam 40% was recorded, giving a measure of compression hardness of the foam. Hysteresis loss was calculated as the area under the stress/height curve on the fourth cycle relative to the first cycle. Results are given in Table 2.

Tear Resistance

Tear resistance was measured according to ASTM D-3574, Test Method F using an INSTRON® Machine Series IX Automated Materials Testing System 1.26. A cut approximately 2.5 cm long was made in each foam test block, starting at one end and following the longitudinal axis. The ends of the two sections on the precut end were secured in the jaws on the test machine, forming a "T" specimen. The jaws were moved apart at a crosshead speed of 5 cm/min, causing the foam to be torn in the direction of the longitudinal precut. Tear resistance was calculated as the force required to tear the foam block per unit of width. Results are given in Table 2.

TABLE 1

| Formulations | Ex 1 | Ex 2 | Ex 3 | Ex 4[a] | Ex 5[a] | Ex 6 | Ex 7 | Ex 8 | Ex 9 | Ex 10 |
|---|---|---|---|---|---|---|---|---|---|---|
| KLP 2203 (pbw) | 200 | 200 | 300 | 200 | 200 | 200 | 200 | 200 | 200 | — |
| ARCOL ® 11-34 (pbw) | — | — | — | — | — | — | — | — | — | 200 |
| RUBINATE ® 9225 (pbw) | 45.7 | 60.5 | 113 | 45.7 | 75.3 | 38.9 | 32 | 22.8 | — | 46.9 |
| MONDUR ® MR (pbw) | — | — | — | — | — | 9.7 | 13.7 | 22.8 | 47 | — |
| Water (pbw) | 2 | 3 | 6 | 2 | 4 | 2 | 2 | 2 | 2 | 2 |
| DABCO ® 33-LV (pbw) | 1.2 | 1.6 | 0.8 | 0.8 | 1.6 | 0.8 | 0.8 | 0.8 | 0.8 | 0.8 |
| DABCO ® DC-1 (pbw) | 0.9 | 1.2 | 0.6 | 0.6 | 1.2 | 0.6 | 0.6 | 0.6 | 0.6 | 0.6 |
| DABCO ® DC5160 (pbw) | 0.04 | 0.04 | 0.04 | 0.04 | 0.04 | 0.04 | 0.04 | 0.04 | 0.04 | 0.04 |
| Index [(NCO/OH) × 100] | 100 | 100 | 100 | 100 | 100 | 105 | 100 | 100 | 100 | 100 |

[a]Foam was aged at 110° C. for about 8 hours

TABLE 2

| Properties | Ex 1 | Ex 2 | Ex 3 | Ex 4[a] | Ex 5[a] | Ex 6 | Ex 7 | Ex 8 | Ex 9 | Ex 10 |
|---|---|---|---|---|---|---|---|---|---|---|
| Calculated Isocyanate Functionality | 2.06 | 2.06 | 2.06 | 2.06 | 2.06 | 2.19 | 2.25 | 2.38 | 2.7 | 2.06 |
| Density (g/l) | 170 | 107 | 61 | 167 | 63 | 117 | 104 | 102 | 109 | 106 |
| Resilience (%) | 48 | 44 | 55 | 40 | 55 | 46 | 52 | 55 | 50 | 45 |
| Compression (N) | [b] | 116 | 59 | [b] | [b] | 135 | 112 | 100 | 124 | 53 |
| Hysteresis Loss (%) | — | 22.3 | 20.3 | — | — | 14.9 | 18.1 | 19.9 | 13.5 | 11 |
| Tear Resistance (N/m) | 133 | 946 | 823 | 208 | 861 | 815 | 725 | 489 | 317 | 122 |

[a]Foam was aged at 110° C. for about 8 hours
[b]Samples were stiffer than the capacity of the testing machine load cell Examples 1, 2 and 3 were formulated to show the effect of water content and, hence, the effect of density on the properties of like foam. It can be seen that density can be varied over a wide range. As density decreases, compression hardness declines; however, resilience, hysteresis loss and tear strength were not strongly dependent upon density, even though the lower density foams had much larger cells than the high density foam.

Examples 1 and 4 and Examples 3 and 5 were substantially similar in formulation on a weight percent basis, however, Examples 4 and 5 were each aged at 110° C. for 8 hours. Aging was seen to improve tear resistance.

Examples 2, 6, 7, 8, and 9 were formulated to look at the effect of isocyanate functionality on properties of foams made at approximately constant density. The ratios of RUBINATE® 9225 and MONDUR® MR in these blends were 100/0, 80/20, 70/30, 50/50, and 0/100 resulting in calculated isocyanate functionality of about 2.06, 2.19, 2.25, 2.38, and 2.7 respectively. It can be seen that tear resistance improves dramatically with decreased functionality.

While this invention has been described in detail for purposes of illustration, it is not construed as limited thereby but is intended to cover all changes and modifications within the spirit and scope thereof.

I claim:

1. A polyurethane foam, produced by a process comprising the steps of:

combining a polydiene diol having a number average molecular weight from 1,000 to 20,000, wherein between 30% and 70% of the polydiene diol forming monomers add by 1,4-addition, and a functionality of from 1.6 to 2 hydroxyl groups per molecule with an aromatic polyisocyanate having a functionality of from 1.8 to 2.5 isocyanate groups per molecule; and foaming the combined polydiene diol and aromatic polyisocyanate to form a resilient polyurethane foam.

2. A polyurethane foam according to claim 1, wherein the polydiene diol has a number average molecular weight of 3,000 to 6,000 and a functionality of from 1.8 to 2 hydroxyl groups per molecule.

3. A polyurethane foam according to claim 1, wherein the polydiene diol is hydrogenated and at least 90% of the carbon-carbon double bonds are saturated.

4. A polyurethane foam according to claim 1, wherein the polydiene diol is a polybutadiene diol.

5. A polyurethane foam according to claim 3, wherein the polydiene diol is a hydrogenated polybutadiene diol having from 40% to 60% 1,4-addition of butadiene.

6. A polyurethane foam according to claim 1, wherein the aromatic polyisocyanate has a functionality of 2.06.

7. A polyurethane foam according to claim 1, wherein foaming agents, at least one catalyst, and a surfactant are combined with the polydiene diol prior to combination of the polydiene diol and the aromatic polyisocyanate.

8. A polyurethane foam according to claim 7, wherein the foaming agents comprise water, the catalyst is selected from an amine catalyst, a tin catalyst, and mixtures thereof, and the surfactant is a silicone surfactant.

9. A polyurethane foam according to claim 1 further comprising aging the resilient polyurethane foam.

10. A polyurethane foam, produced by a process comprising the steps of:

mixing from 200 to 300 parts by weight of a polydiene diol having a number average molecular weight from 1,000 to 10,000, wherein between 30% and 70% of the polydiene diol forming monomers add by 1,4-addition and a functionality of from 1.8 to 2 hydroxyl groups per molecule with from 2 to 6 parts by weight of water, from 0.5 to 2 parts by weight of an amine catalyst, from 0.5 to 1.5 parts by weight of a tin catalyst, and from 0 to 1 parts by weight of a silicon surfactant; and adding to the polydiene diol from 90 to 110 index amount of an aromatic polymeric isocyanate having a functionality of from 1.8 to 2.5 isocyanate groups per molecule.

11. A polyurethane foam according to claim 10, wherein the polydiene diol is a hydrogenated polybutadiene diol having from 40% to 60% 1,4-addition of butadiene and at least 90% of the carbon-carbon double bonds are saturated.

12. A polyurethane foam according to claim 11, wherein the aromatic polymeric isocyanate has a functionality of 2.06.

13. A polyurethane foam according to claim 10, further comprising aging the polyurethane foam.

14. A polyurethane foam, produced by a process comprising the steps of:

mixing 200 to 300 parts by weight of a hydrogenated polybutadiene diol having a number average molecular weight from 3,000 to 6,000, from 40% to 60% 1,4-addition of butadiene, saturation of at least 90% of the carbon-carbon double bonds, and a functionality of from 1.8 to 2.0 hydroxyl groups per molecule with from 2 to 6 parts by weight of water, from 0.5 to 2 parts by weight of an amine catalyst, from 0.5 to 1.5 parts by weight of a tin catalyst, and from 0 to 1 parts by weight of a silicon surfactant; and adding to the hydrogenated polybutadiene diol from 90 to 110 index amount of an aromatic polymeric isocyanate having a functionality of from 1.8 to 2.5 isocyanate groups per molecule.

15. A polyurethane foam according to claim 14, wherein the aromatic polymeric isocyanate has a functionality of 2.06.

16. A polyurethane foam according to claim 14, further comprising aging the polyurethane foam.

17. A polyurethane foam comprising:

a hydrogenated polybutadiene diol having a number average molecular weight from 3,000 to 6,000, from 40% to 60% 1,4-addition of butadiene, saturation of at least 90% of the carbon-carbon double bonds, and a functionality of from 1.8 to 2.0 hydroxyl groups per molecule;

water;

an amine catalyst;

a tin catalyst;

a silicon surfactant; and an aromatic polymeric isocyanate having a functionality of from 1.8 to 2.5 isocyanate groups per molecule.

18. The polyurethane foam of claim 17, wherein the aromatic polymeric isocyanate has a functionality of 2.06.

19. A polyurethane foam according to claim 10 wherein 100 index amount of aromatic polyisocyanate is added to the polydiene diol.

20. A polyurethane foam according to claim 14 wherein 100 index amount of aromatic polyisocyanate is added to the polydiene diol.

* * * * *